(12) United States Patent
Katagiri et al.

(10) Patent No.: US 8,121,481 B2
(45) Date of Patent: Feb. 21, 2012

(54) CHROMATIC DISPERSION COMPENSATION DESIGNING METHOD IN OPTICAL NETWORK AND A SYSTEM THEREOF

(75) Inventors: Toru Katagiri, Kawasaki (JP);
Tomohiro Hashiguchi, Kawasaki (JP);
Yutaka Takita, Kawasaki (JP);
Kazuyuki Tajima, Kawasaki (JP);
Motoyoshi Sekiya, Kawasaki (JP);
Takashi Toyomaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 576 days.

(21) Appl. No.: 12/395,709

(22) Filed: Mar. 1, 2009

(65) Prior Publication Data
US 2009/0220241 A1 Sep. 3, 2009

(30) Foreign Application Priority Data
Feb. 29, 2008 (JP) .................... 2008-050599

(51) Int. Cl.
*H04B 10/08* (2006.01)
*H04B 10/12* (2006.01)
*H04J 14/02* (2006.01)

(52) U.S. Cl. ................. 398/81; 398/29; 398/147

(58) Field of Classification Search ............... 398/25, 398/29, 81, 147, 159
See application file for complete search history.

(56) References Cited

U.S. PATENT DOCUMENTS

| 6,580,861 B2 | 6/2003 | Bickham et al. |
| 7,382,979 B2 | 6/2008 | Akiyama et al. |
| 2004/0179850 A1 | 9/2004 | Katagiri et al. |

FOREIGN PATENT DOCUMENTS

| JP | 2004-274615 A | 9/2004 |
| WO | WO-2005/006604 | 1/2005 |

*Primary Examiner* — Armando Rodriguez
(74) *Attorney, Agent, or Firm* — Fujitsu Patent Center

(57) ABSTRACT

A residual chromatic dispersion target value at a terminal node is set for each wavelength path, and also, candidates of a dispersion compensation amount settable in each chromatic dispersion compensation module on an optical network are set, and further, computation processing is executed for selecting the dispersion compensation amount in each chromatic dispersion compensation module from the candidates so that the sum of errors between the residual chromatic dispersion amounts and the set residual chromatic dispersion target values at the terminal nodes for all of wavelength paths becomes minimum. As a result, for each wavelength path on the optical network, the dispersion compensation amount in each chromatic dispersion compensation module can be designed in optimum so as to satisfy the desired optical signal quality at the terminal node, while considering the residual chromatic dispersion during the transmission.

20 Claims, 9 Drawing Sheets

FIG.5

DCM TABLE

| DISPERSION COMPENSATION AMOUNT [ps/nm] | LOSS [dB] | |
|---|---|---|
| -50 | 1.3 | |
| -100 | 1.5 | |
| -150 | 1.8 | ← ≧ LOSdcm_lower (= 1.7 dB) |
| -200 | 2.0 | DCM CANDIDATE |
| ⋮ | ⋮ | |
| -850 | 5.3 | |
| -900 | 5.5 | ← ≦ LOSdcm_upper (= 5.7 dB) |
| -950 | 5.8 | |
| ⋮ | ⋮ | |

| SPAN No. I | DCM CANDIDATE No. c | Ddcm[c] | VARdcm[c] |
|---|---|---|---|
| 1 | 1 | -450 | 0 |
| 1 | 2 | -400 | 1 |
| 1 | 3 | -350 | 0 |
| 2 | 4 | -200 | 1 |
| 2 | 5 | -150 | 0 |
| 3 | 6 | -1000 | 0 |
| 3 | 7 | -900 | 0 |
| 3 | 8 | -800 | 1 |

CHROMATIC DISPERSION COMPENSATION DESIGNING METHOD IN OPTICAL NETWORK AND A SYSTEM THEREOF

CROSS-REFERENCE TO RELATED APPLICATION

This application is based upon and claims the benefit of priority of the prior Japanese Patent Application No. 2008-050599, filed on Feb. 29, 2008, the entire contents of which are incorporated herein by reference.

FIELD

The present invention relates to a technology for compensating for the chromatic dispersion in an optical network, and in particular, to a chromatic dispersion compensation designing method of optimizing a compensation amount in a plurality of chromatic dispersion compensation modules arranged on the optical network and a chromatic dispersion compensation designing system thereof.

BACKGROUND

In recent years, in an optical network field applying a wavelength division multiplexing (WDM) technology, it is possible to configure an optical network having complex topology, such as a ring interconnection network or a mesh network, by realizing an optical add/drop multiplexing (OADM) apparatus which realizes the adding/dropping of optical signals without any opto-electronic conversion at a wavelength unit and the changing-over the optical signal path, or a wavelength cross-connecting (WXC) apparatus which is also called an optical hub.

In such an optical network, as one of factors determining the transmission quality of optical signal, there is the chromatic dispersion. In order to suppress the waveform degradation of optical signals by an influence of the chromatic dispersion, chromatic dispersion compensation modules are appropriately arranged along an optical transmission path to thereby perform the chromatic dispersion compensation, so that a residual chromatic dispersion value over the end-to-end of a path (to be referred to as a wavelength path hereunder) through which an optical signal of each wavelength transmitted over the optical network passes is converged in the dispersion tolerance at a terminal end (a reception end) of the wavelength path. Therefore, the design to determine a dispersion compensation amount of each chromatic dispersion compensation module plays an important role in deciding the transmission quality of the light signal.

Heretofore, as a chromatic dispersion compensation designing method for the ring interconnection network or the mesh network, there has been proposed a method of determining a dispersion compensation amount in accordance with a dispersion compensation map, in U.S. Pat. No. 6,580,861 and Japanese Laid-open Patent Publication No. 2004-274615. However, there are an error between a design value of the chromatic dispersion in an optical fiber used for an optical transmission path and an actual value thereof, and an error in the dispersion compensation which is caused by a generally discrete dispersion compensation amount in a chromatic dispersion compensation module. Since the accumulation of such errors is different for each wavelength path, it is problematically hard to realize the chromatic dispersion compensation corresponding to a desired dispersion compensation map on all of wavelength paths on the optical network.

As a conventional technology for solving the above problem, the invention in International Publication Pamphlet No. WO 2005/006604 discloses a designing method and a system of determining a dispersion compensation amount of a chromatic dispersion compensation module provided in each wavelength path, so that the residual chromatic dispersion at each terminal end point of a plurality of wavelength paths which is extracted from the optical network having the complex topology, is all within an allowable residual chromatic dispersion range set for all of wavelength paths. In such a conventional designing method, for each wavelength path, there is prepared the inequality provided that the sum of a chromatic dispersion value (constant) of an optical fiber along the wavelength path and the dispersion compensation amount (variable) of each chromatic dispersion compensation module arranged on each wavelength path is within a previously set allowable residual chromatic dispersion range (constant), and then, the simultaneous inequality for all of wavelength paths is solved to thereby judge whether or not there exists the solution of the dispersion compensation amount in each chromatic dispersion compensation module.

However, the following problems still remain in the conventional chromatic dispersion designing method as described above.

Firstly, in the conventional designing method, the solution of the dispersion compensation amount in each chromatic dispersion compensation module, which is obtained by the simultaneous inequality, is given within the required range. Therefore, if a plurality of combinations of dispersion compensation amounts in the respective chromatic dispersion compensation modules exists, there is a problem in that a specific solution method is not indicated as to which combination may be selected from these combinations.

Secondly, in the conventional designing method, there has been considered only the condition that the residual chromatic dispersion at each terminal end point of each wavelength path is within the previously set allowable residual chromatic dispersion range. Under such a condition, since the residual chromatic dispersion of each wavelength path along the way is not considered, there may be set the dispersion compensation amount resulting in the significant degradation of the optical signals due to the residual chromatic dispersion during the transmission. Consequently, even if the chromatic dispersion compensation in accordance with the design is performed at the terminal end point, there is a possibility that it becomes hard to restore the optical signal quality.

SUMMARY

The present invention has been accomplished in view of the above problems and has an object to provide a chromatic dispersion compensation designing method in an optical network and a system thereof, capable of determining a dispersion compensation amount in each chromatic dispersion compensation module arranged on the optical network so as to satisfy the desired optical signal quality at a terminal node of each of a plurality of wavelength paths set on the optical network, while considering the residual chromatic dispersion along a transmission path of each wavelength path.

In order to achieve the above object, an aspect of the invention provides a chromatic dispersion compensation designing method of, in an optical network including a plurality of nodes connected to each other via optical transmission paths, setting a compensation amount in the chromatic dispersion compensation performed on a plurality of wavelength paths indicating routes from starting nodes to terminal nodes of a plurality of optical signals transmitted over the optical network, the method comprising: (A) inputting with optical network information; (B) setting a residual chromatic dispersion target value at the terminal node for each wavelength path, based on the optical network information; (C) setting candidates of the dispersion compensation amount in a plurality of chromatic dispersion compensation modules arranged on the respective wavelength paths; and (D) executing computation processing of selecting the dispersion compensation amount in each chromatic dispersion compensation module from the candidates so that the sum of errors between residual chromatic dispersion values and the residual chromatic dispersion target values at the terminal nodes for all of wavelength paths becomes minimum.

Further, another aspect of the invention provides a chromatic dispersion compensation designing system of, in an optical network including a plurality of nodes connected to each other via optical transmission paths, setting a compensation amount in the chromatic dispersion compensation performed on a plurality of wavelength paths indicating routes from starting nodes to terminal nodes of a plurality of optical signals transmitted over the optical network, comprising: an inputting apparatus configured to input with optical network information; a target value setting apparatus configured to set a residual chromatic dispersion target value at the terminal node for each wavelength path, based on the optical network information input by the input apparatus; a candidates setting apparatus configured to set candidates of the dispersion compensation amount in a plurality of chromatic dispersion compensation modules arranged on the respective wavelength paths; and a computing apparatus configured to execute computation processing of selecting the dispersion compensation amount in each chromatic dispersion compensation module from the candidates set by the candidates setting apparatus so that the sum of errors between residual chromatic dispersion values and the residual chromatic dispersion target values set by the target value setting apparatus at the terminal nodes for all of wavelength paths becomes minimum.

According to the chromatic dispersion compensation designing method in the optical network and the system thereof as described above, even in an optical network having complex topology, such as a mesh network or the like, it becomes possible to readily design optimum chromatic dispersion amounts in the respective chromatic dispersion compensation modules, which can satisfy the desired optical signal quality at the terminal nodes while suppressing the residual chromatic dispersion during the transmission within a required range, for all of wavelength paths set on the optical network. Consequently, the degradation of the optical signal quality caused by the chromatic dispersion in all of wavelength paths on the optical network can be suppressed appropriately, and as a result, the number of regeneration repeaters required in the optical network can be reduced at minimum so that the designing leading to a decrease of network cost can be performed.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 5 is a diagram showing one example of DCM table;

DESCRIPTION OF EMBODIMENT

Hereinafter, an embodiment of the present invention will be described with reference to drawings.

Figure 1:
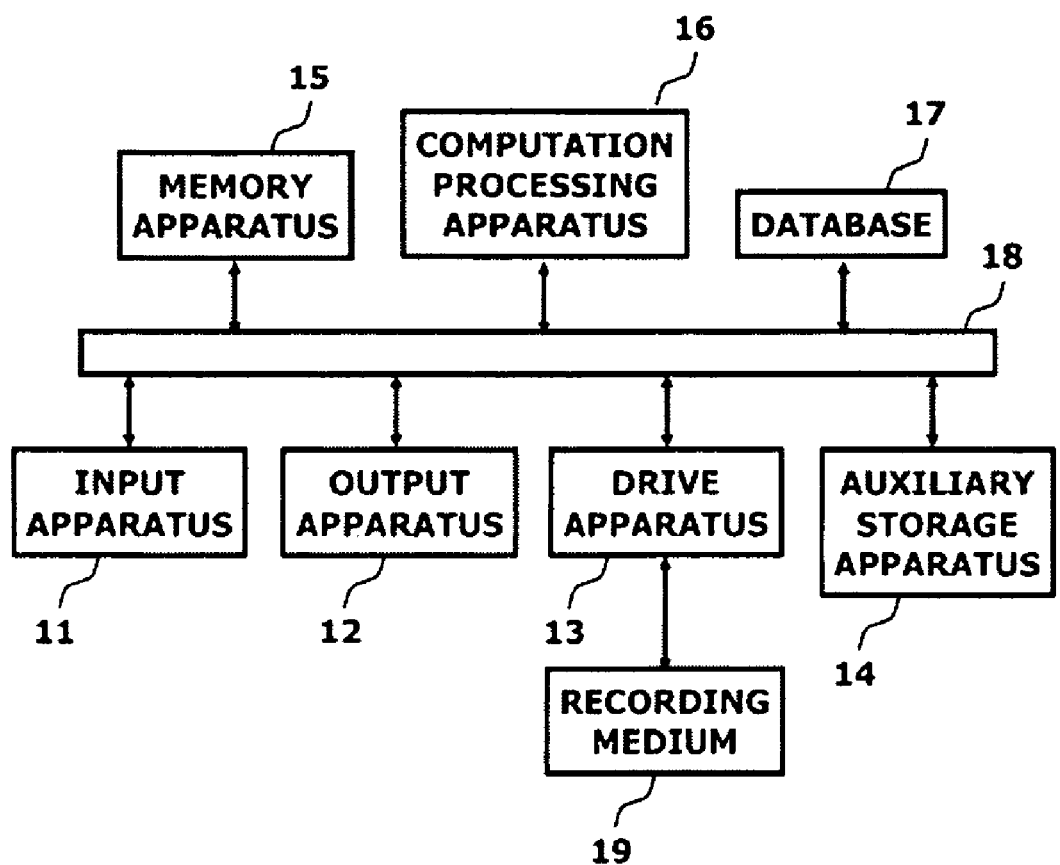
FIG. 1 is a diagram showing a hardware configuration in one embodiment of a chromatic dispersion compensation designing system according to the present invention.

FIG. 1 is a diagram showing a hardware configuration in one embodiment of a chromatic dispersion compensation designing system according to the present invention.

In FIG. 1, the chromatic dispersion compensation designing system comprises: an input apparatus 11; an output apparatus 12; a drive apparatus 13; an auxiliary storage apparatus 14; a memory apparatus 15; a computation processing apparatus 16; and a database 17, and these apparatuses are connected to each other via a system bus 18. This chromatic dispersion compensation designing system can be of a dedicated apparatus configuration, but it is possible to apply a general purpose computer, a workstation or the like, for example, as the chromatic dispersion compensation designing system.

To be specific, the input apparatus 11 includes a keyboard, a mouse and the like, which are controlled by a user, and is input with various types of data. The output apparatus 12 includes a display which displays various types of windows, data and the like necessary for controlling a program of the chromatic dispersion compensation designing system, and the various types of windows, the data and the like are displayed on the display based on an execution program. Here, in the present invention, the execution program to be installed in the chromatic dispersion compensation designing system is provided by a recording medium 19, such as a CD-ROM or the like, for example. The recording medium 19 recorded with the program is inserted in the drive apparatus 13, and the execution program stored in the recording medium 19 is installed in the auxiliary storage apparatus 14 from the recording medium 19 via the drive apparatus 13.

The computation processing apparatus 16 controls processing of the entire chromatic dispersion compensation designing system, inclusive of various types of computations and respective processing to be described later, based on the execution program read to be stored by the memory apparatus 15. Further, various types of information needed during the program execution can be obtained from the database 17, and also, can be stored therein.

Figure 2:
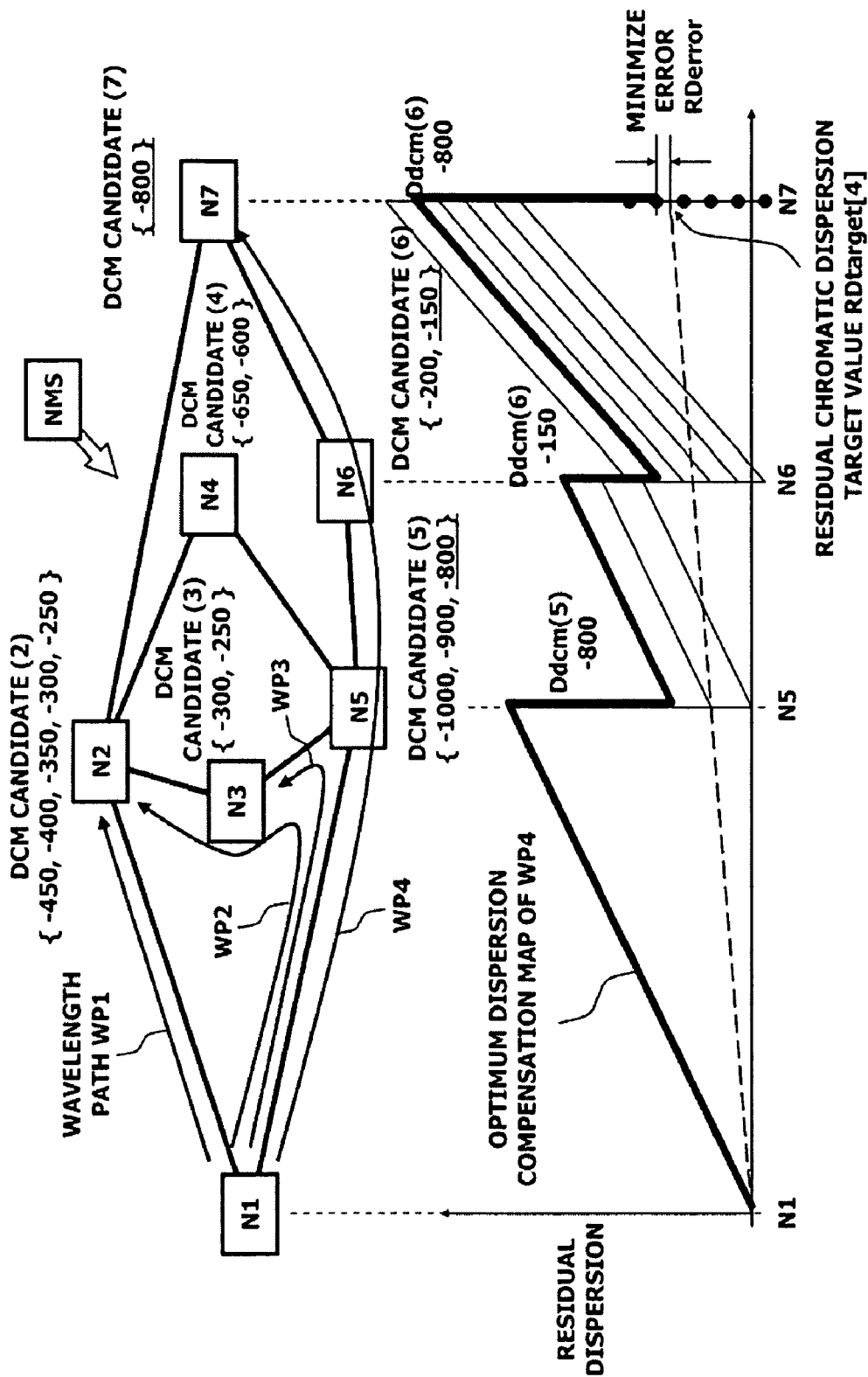
FIG. 2 is a diagram showing a configuration example of optical network to which the present invention is applied, and one example of dispersion compensation map.

FIG. 2 is a diagram showing a configuration example of an optical network to which a chromatic dispersion compensation designing method according to the present invention is applied, and one example of dispersion compensation map.

The optical network shown on an upper side of FIG. 2 includes, for example, 7 nodes N1 to N7 connected in mesh via optical transmission paths, and in each of the nodes N1 to N7, a chromatic dispersion compensation module (DCM) (not shown in the figure) is provided. In the example shown in the figure, on this optical network, there are set: a wavelength path WP1 through which optical signals are transmitted from the node N1 at starting end to the node N2 at terminal end without passing through other nodes; a wavelength path WP2 through which the optical signals are transmitted from the node N1 at starting end to the node N2 at terminal end via the nodes N5 and N3; a wavelength path WP3 through which the optical signals are transmitted from the node N1 at starting end to the node N3 at terminal end via the node N5; and a wavelength path WP4 through which the optical signals are transmitted from the node N1 at starting end to the node N7 at terminal end via the nodes N5 and N6. Operations of the nodes N1 to N7 are centrally managed by a network management system (NMS). The dispersion compensation map exemplarily shown in a lower side of FIG. 2 is an optimum dispersion compensation map for the wavelength path WP4, which is determined by the chromatic dispersion compensation designing method of the present invention (to be described in detail later). In this optimum dispersion compensation map for the wavelength path WP4, −800 ps/nm is set as a dispersion compensation amount of the DCM in the node N5, −150 ps/nm is set as a dispersion compensation amount of the DCM in the node N6, and −800 ps/nm is set as a dispersion compensation amount of the DCM in the node N7.

Next, there will be described in detail one example of processing executed in the chromatic dispersion compensation designing system described above, referring to a flowchart of FIG. 3.

In the present chromatic dispersion compensation designing system, firstly, in step 11 (to be indicated as S11 in the figure, and the same rule will be applied to the subsequent steps), network information is input, and thereafter, in step 12, parameters for the respective wavelength paths are set, and further, in step 13, parameters for the respective chromatic dispersion compensation modules are set. Then, in step 14, the dispersion compensation amounts of the chromatic dispersion compensation modules are designed (computation processed) using the set parameters, and in step 15, the designing results are output. In the followings, the details of the processing in each step will be specifically described.

In the inputting processing of the network information in step 11, for the optical network being a designing object, the network information necessary for designing the chromatic dispersion compensation amounts is input by the user using the input apparatus 11 (FIG. 1). The above described network information includes network topology information, node information, span information and wavelength path information.

To be specific, as the network topology information, there is information relating to an arrangement of each node and a connection state between each node on the optical network. Further, as the node information, there is information relating to types or functions of respective nodes (for example, an OADM node, an optical amplification repeating node or the like). In the optical network exemplarily shown in FIG. 2, since the chromatic dispersion compensation module is arranged in each node, each node has a function of a dispersion compensation node in addition to a function of OADM node, optical amplification repeating node or the like. However, in the present invention, it is not required that the nodes on the optical network all have the dispersion compensation functions, and therefore, it may be simply clarified based on the node information whether or not each node has the dispersion compensation function. As the span information, there is information (for example, types of fibers, the fiber length, a chromatic dispersion value, a transmission loss and the like) of an optical fiber which is used for the optical transmission path connecting between the nodes adjacent to each other. As the wavelength path information, there are path information of optical signals transmitted over the optical network, types of signals (for example, 2.4 Gbps, 10 Gbps, 40 Gbps or 100 Gbps), wavelength information, output power information of optical signal from each node. One wavelength path contains optical signals of one wavelength or plural wavelengths, which are transmitted over the same path, and when parameters and the like (to be described later) are set for the plural wavelength paths set on the optical network, a standard wavelength representing the optical signals transmitted over the respective wavelength paths is used. For this standard wavelength, it is possible to previously set, for example, a center wavelength of a signal waveband.

Incidentally, the network information input in the present invention is not limited to the above described specific examples, and any types of information may be input if such information relates to respective parameters to be used for the computation processing of the chromatic dispersion compensation designing described later.

Next, in the parameter setting of each wavelength path in step 12, as the parameters for the respective wavelength paths necessary for the chromatic dispersion compensation designing, there are set an allowable residual chromatic dispersion range (chromatic dispersion tolerance) at a terminal node of each wavelength path and a residual chromatic dispersion target value at the terminal node of each wavelength path, based on the network information input in step 11.

To be specific, as the allowable residual chromatic dispersion range, a residual chromatic dispersion range allowable at the terminal node is obtained based on the path information of each wavelength path, the node information along the path, the fiber information between the nodes on the path, the signal types of the optical signals transmitted over each wavelength path and the output power information of the optical signal from each node. The allowable residual chromatic dispersion range is a designing parameter which is basically same as an allowable residual chromatic dispersion range at a terminal end point in a conventional chromatic dispersion compensation designing method. On the other hand, the residual chromatic dispersion target value is newly set within the allowable residual chromatic dispersion range obtained as in the above manner, as a target design value of the residual chromatic dispersion. The residual chromatic dispersion target value is preferably set to be inside an intermediate portion of the allowable chromatic dispersion range except for the vicinity of an upper limit portion and the vicinity of a lower limit portion, and specifically, can be set at a midpoint of the allowable residual chromatic dispersion range obtained using the next formula (1).

$$RDtarget[i] = \frac{RDtolerance\_upper[i] + RDtolerance\_lower[i]}{2} \quad (1)$$

In the above formula, RDtarget[i] is a residual chromatic dispersion target value of a wavelength path i, RDtolerance- _upper[i] is an upper limit value of the allowable residual chromatic dispersion range of the wavelength path i, and RDtolerance_lower[i] is a lower limit value of the allowable residual chromatic dispersion range of the wavelength path i. Incidentally, the residual chromatic dispersion target value in the present invention is not limited to be set at the midpoint of the allowable residual chromatic dispersion range, and accordingly, the formula (1) merely shows one example of residual chromatic dispersion target value.

Next, in the parameter setting of each chromatic dispersion compensation module in step 13, candidates (which may be abbreviated as "DCM candidates" hereunder) of the dispersion compensation amount in the chromatic dispersion compensation module arranged in each node are set as parameters for the chromatic dispersion compensation modules necessary for the chromatic dispersion compensation designing, based on the network information input in step 11 and the parameter for each wavelength path set in step 12. In such a setting method of the DCM candidates, it is preferable to follow at least one of three methods shown below, for example.

In a first method, it is supposed that, as the chromatic dispersion compensation module in each node, for example, there is used a dispersion compensation fiber module capable of changing-over to connect a plurality of dispersion compensation fibers, to thereby discretely vary the dispersion compensation amount. In this case, an insertion loss of the chromatic dispersion compensation module is changed according to the dispersion compensation amount set for this chromatic dispersion compensation module. Paying attention to the change in insertion loss according to the dispersion compensation amount, for example in the case where the chromatic dispersion compensation module is arranged on an input stage of an optical amplifier, the candidates of the dispersion compensation amount in the chromatic dispersion compensation module are set so that the power of the optical signal passed through the chromatic dispersion compensation module after transmitted over the optical transmission path is converged in an input dynamic range of the optical amplifier. Incidentally, in the case where the chromatic dispersion compensation module is arranged on an inter-stage of optical amplifiers of multi-stages configuration, the candidates of the dispersion compensation amount in the chromatic dispersion compensation module may be set corresponding to an insertion loss allowed at the inter-stage of the optical amplifiers.

Figure 4:
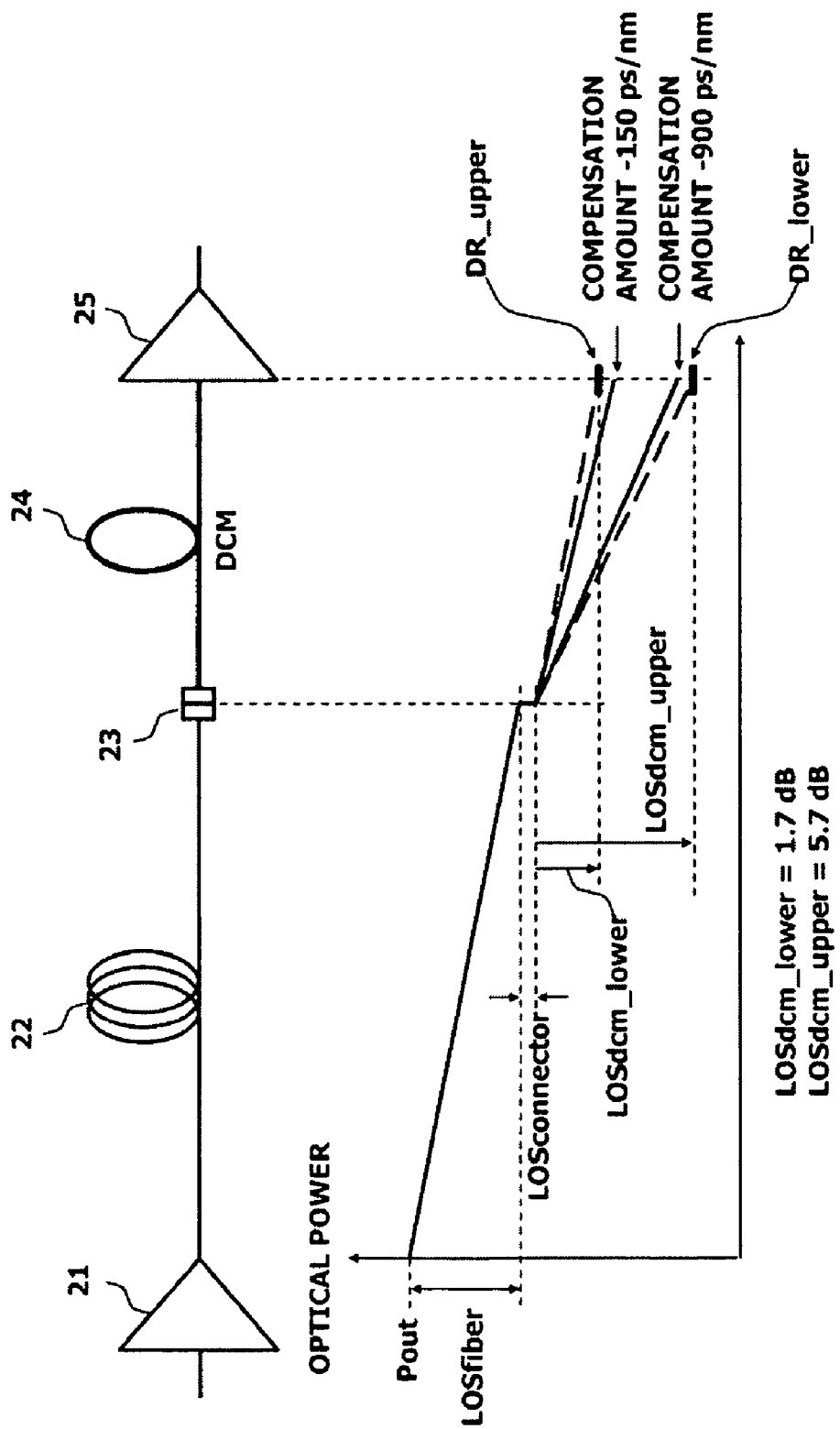
FIG. 4 is a diagram for explaining a setting method of DCM candidates by a first method for step 13 in FIG. 3.

To be specific, there will be described in detail the first method, supposing for example, a span configuration as shown in FIG. 4, that is, a configuration in which a chromatic dispersion compensation module (DCM) 24 is arranged on an input stage of an optical amplifier 25 on the reception side and an optical signal transmitted from an optical amplifier 21 on the sending side to an optical transmission path 22 is input to the DCM 24 via a connector 3 connecting the optical transmission path 22 and the DCM 24. In such a span configuration, in the case where the output power of the optical signal from the optical amplifier 21 on the sending side (the input power of the optical signal to the optical transmission path 22) is Pout, a loss of the optical transmission path 22 is LOSfiber, a connection loss of the connector 23 is LOSconnector, and an upper limit value of an input dynamic range of the optical amplifier 25 on the reception side is DR_upper and a lower limit value thereof is DR_lower, a range of an insertion loss of the DCM 24 which is allowed in the span is given by the following formula (2) provided that an upper limit value of the insertion loss of the DCM 24 is LOSdcm_upper and a lower limit value thereof is LOSdcm_lower.

$$\left.\begin{array}{l}LOSdcm\_upper \leq Pout - (LOSfiber + LOSconnector) - DR\_lower \\ LOSdcm\_lower \geq Pout - (LOSfiber + LOSconnector) - DR\_upper\end{array}\right\} \quad (2)$$

In the example shown in FIG. 4, the upper limit value LOSdcm_upper of the allowable insertion loss range of the DCM 24 is 5.7 dB and the lower limit value LOSdcm_lower thereof is 1.7 dB. In accordance with the allowable insertion loss range of the DCM 24, the candidates of the dispersion compensation amount of the DCM 24 are selected from a DCM table as shown in FIG. 5 holding a correspondence relation between discrete dispersion compensation amounts of the DCM 24 and the insertion loss thereof. Namely, here, the dispersion compensation amounts of from −150 ps/nm to −900 ps/nm are set as the DCM candidates. Incidentally, the DCM table corresponding to each DCM on the optical network may be given as the node information or a part of the span information when the network information is input in step 11 (FIG. 3) for example, to be stored in the database 17 (FIG. 1).

In a second method, for each of spans arranged with the chromatic dispersion compensation modules (all of spans in the optical network example shown in FIG. 2, since the chromatic dispersion compensation modules are in all of spans), the residual chromatic dispersion target value corresponding to the wavelength path passing through this span (or corresponding to each of the respective wavelength paths if there are plural wavelength paths passing through this span) is individually supposed, and the chromatic dispersion compensation amounts corresponding to a range containing all of the residual chromatic dispersion target values are set as the DCM candidates corresponding to this span. Incidentally, if there is the span which is not arranged with the chromatic dispersion compensation module, this span and the span which is connected thereto and is arranged with the chromatic dispersion compensation module are regarded as one span.

Figure 6:
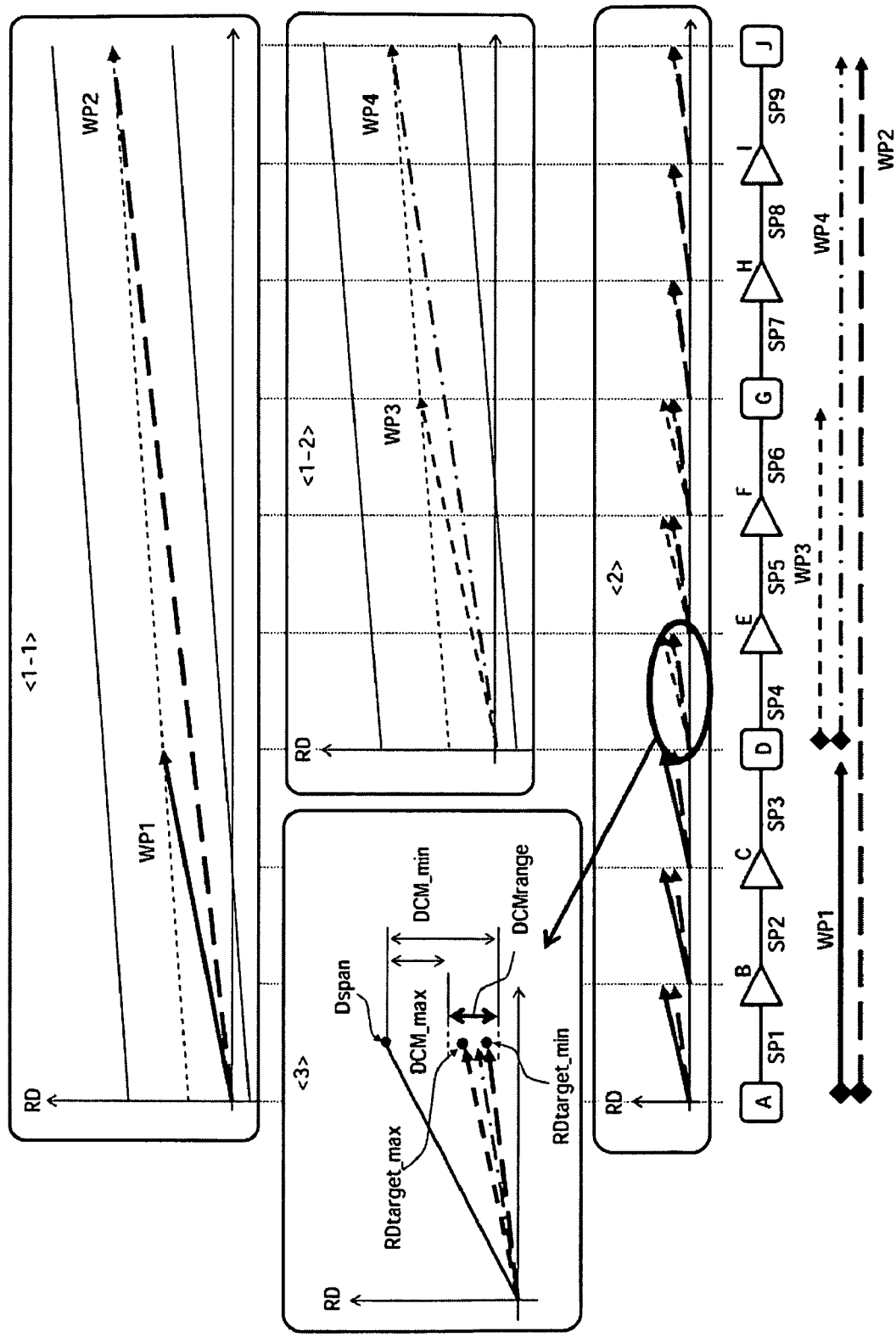
FIG. 6 is a diagram for explaining a setting method of DCM candidates by a second method for step 13 in FIG. 3.

FIG. 6 is an explanation diagram specifically showing a setting method of the DCM candidates according to the second method. Herein, in order to readily understand the explanation, a linear network in which nodes A to I are consecutively connected is supposed as shown in a lowest stage of FIG. 6. Among the nodes A to J, the nodes A, D, G and J are OADM nodes, and the nodes B, C, E, F, H and I are optical amplification repeating nodes. As the wavelength paths, there are set the wavelength path WP1 (bolded solid line) from the node A to the node D, the wavelength path WP2 (bolded dotted line) from the node A to the node 1, the wavelength path WP3 (narrow dotted line) from the node D to the node G and the wavelength path WP4 (long dashed and short dashed line) from the node D to the node J.

Firstly, as shown in <1-1> on an uppermost stage and <1-2> on the right side of a second stage in FIG. 6, for the respective wavelength paths WP1 to WP4, a slope of the residual chromatic dispersion corresponding to each of the wavelength paths WP1 to WP4 is determined using the residual chromatic dispersion target value at the terminal node of each wavelength path set in step 12. To be specific, herein, if the residual chromatic dispersion target value at the terminal node of the wavelength path WPi (i=1, 2, 3, 4) is RDtarget [i] and a distance of the wavelength path WPi is L[i], the slope RDtarget_slope [i] thereof is obtained by the following formula (3).

$$RDtarget\_slope[i]=RDtarget[i]/L[i] \quad (3)$$

Note, two parallel narrow solid lines shown in <1-1> and <1-2> of FIG. 6 indicate the upper limit value of the allowable residual chromatic dispersion range and the lower limit value thereof, and also, dotted lines each indicates the midpoint of the allowable residual chromatic dispersion range.

Next, as shown in <2> on a third stage of FIG. 6, for each span SPI (I=1, 2, . . . , 9) between the nodes A to J, the residual chromatic dispersion target values at the reception side node of the span SPI are determined for all of the wavelength paths WPi passing through the span SPI. To be specific, the residual chromatic dispersion slope RDtarget_slope[i] corresponding to each of the wavelength paths WPi obtained by the formula (3) is applied to each span SPI, and if a distance of the span SPI is Lspan[I], the residual chromatic dispersion target value RDtarget[i,I] of the wavelength path WPi at the reception side node of the span SPI is obtained by the following formula (4).

$$RDtarget[i,I] = RDtarget\_slope[i] \cdot Lspan[I] \qquad (4)$$

Next, as shown in <3> on the left side of the second stage in FIG. 6, the DCM candidates corresponding to each span SPI is set using the residual chromatic dispersion target value RDtarget[i,I] obtained by the formula (4). To be specific, if the number of wavelength paths WPi passing through the span SPI is "n," there are the residual chromatic dispersion target values RDtarget[i,I] in "n" numbers. In the example of FIG. 6, in each of the spans SP1, SP2, SP3, SP7, SP8 and SP9, there are two residual chromatic dispersion target values RDtarget[i,I], and in each of the spans SP4, SP5 and SP6, there are three residual chromatic dispersion target values RDtarget[i,I]. In <3> of FIG. 6, a state of the span SP4 is shown expansively as one example. In the span SP4, the residual chromatic dispersion target value (narrow dotted line) corresponding to the wavelength path WP3 is a maximum value RDtarget_max=RDtarget[3,4], and the residual chromatic dispersion target value (bolded dotted line) corresponding to the wavelength path WP2 is a minimum value RDtarge_min=RDtarget[2,4]. Incidentally, a point Dspan in the figure indicates the chromatic dispersion value of the span SP4. Here, the chromatic dispersion compensation amount range which contains all of the residual chromatic dispersion target values RDtarget[i,I] for the span SPI is regarded as DCMrange[I], this DCMrange[I] can be expressed by the inequality shown in the following formula (5).

$$RDtarget\_min[i,I] - Dspan[i,I] \leq DCMrange[I] \leq RDtarget\_max[i,I] - Dspan[I] \qquad (5)$$

Therefore, the DCM dispersion compensation amounts satisfying a relation in the formula (5) are set as the DCM candidates of the span SPI. For example, if the dispersion compensation amounts of the DCM disposed in the span SPI are −50 ps/nm to −1000 ps/nm at 50 ps/nm basis, and DCMrange[I] obtained by the formula (5) is −430 ps/nm≦DCMrange[I]≦−280 ps/nm, {−300, −350, −400} ps/nm are set as the DCM candidates.

Incidentally, for the DCM candidates set in accordance with the second method, as indicated in the first method, it is desirable to consider whether the insertion loss at each dispersion compensation amount of the DCM meets the input dynamic range of the optical amplifier.

Figure 7:
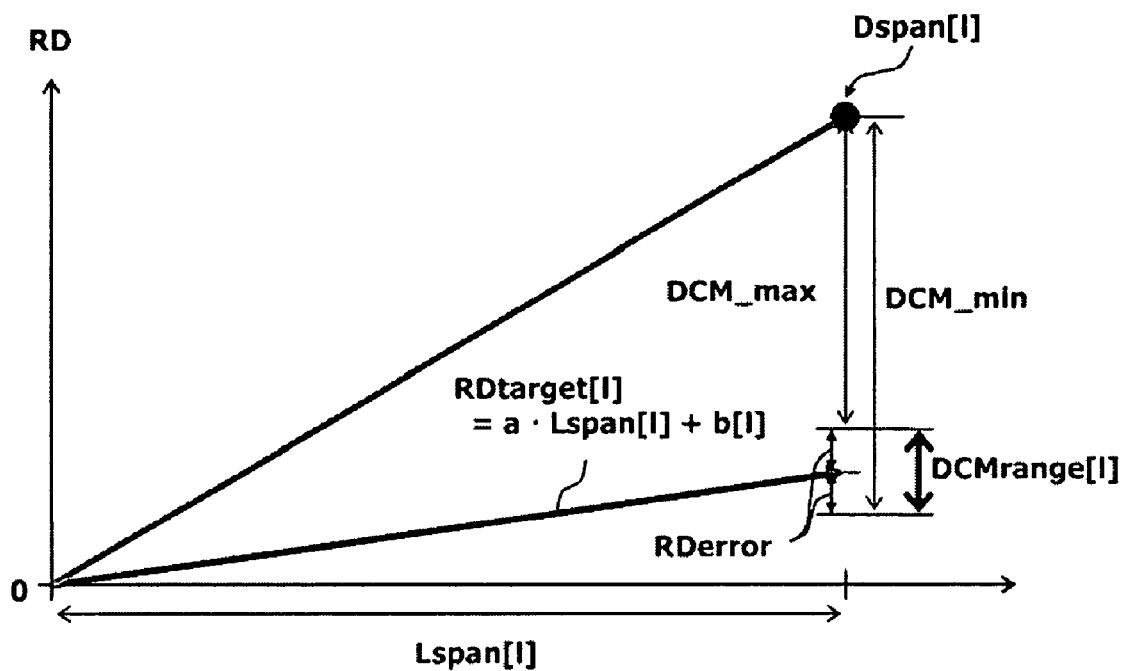
FIG. 7 is a diagram for explaining a setting method of DCM candidates by a third method for step 13 in FIG. 3.

In a third method, as a setting method of the DCM candidates which are obtained by simplifying the second method, as shown in FIG. 7 for example, the residual chromatic dispersion target value of each span is regarded to depend on only the span distance, and the residual chromatic dispersion target value RDtarget[I] of the span SPI is given by a primary expression as shown in the following formula (6), in which the span distance Lspan [I] is a variable.

$$RDtarget[I] = a \cdot Lspan[I] + b[I] \qquad (6)$$

In the above formula, "a" is a constant indicating the slope of the residual chromatic dispersion target value relative to the span distance, "b[I]" is a constant indicating an offset amount of the residual chromatic dispersion target value in the sending side node of the span SPI. FIG. 7 shows one example of b[I]=0. In this case, the residual chromatic dispersion target value RDtarget[I] is included in the span SPI, and also, a range of allowable error ±RDerror relative to the previously set RDtarget [I] is determined as DCMrange[I], and the dispersion compensation amounts within the DCMrange[I] are set as the DCM candidates.

Incidentally, also for the DCM candidates set in accordance with the third method, as indicated in the first method, it is desirable to consider whether the insertion loss at each dispersion compensation amount of the DCM meets the input dynamic range of the optical amplifier.

Figure 3:
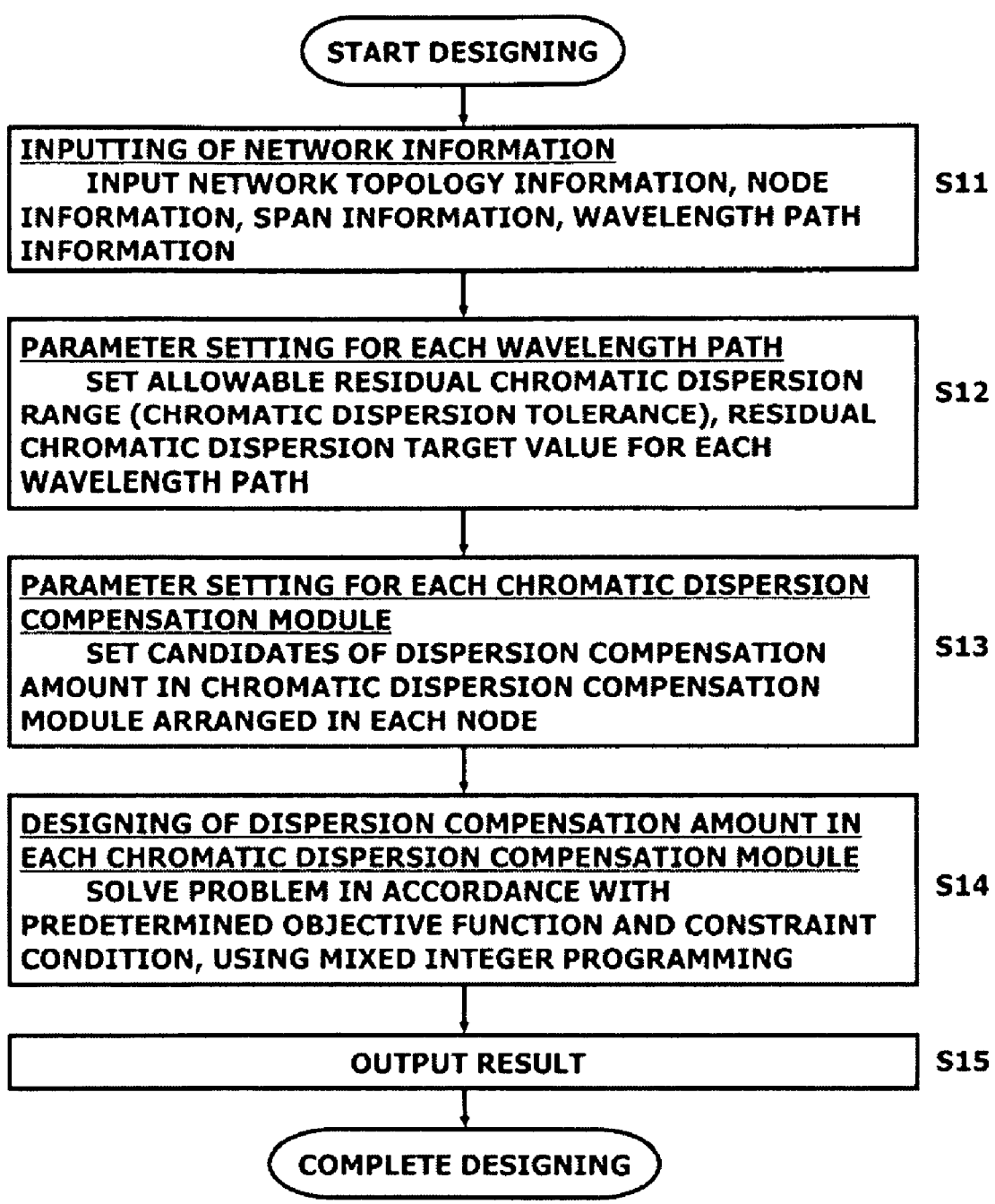
FIG. 3 is a flowchart showing one example of processing executed by the chromatic dispersion compensation designing system in FIG. 1.

When the setting of the DCM candidates is completed as in the above manner, next, the designing (computation processing) of the dispersion compensation amount of each chromatic dispersion compensation module is executed in step 14 (FIG. 3). In step 14, using the respective parameters obtained in steps 11 to 13, an optimum value of the dispersion compensation amount of each chromatic dispersion compensation module on the optical network is determined by the computation processing considering all of wavelength paths. Herein, in order to obtain optimum solution of the dispersion compensation amount of each chromatic dispersion compensation module, a case of applying linear programming is indicated as one example.

In this case, as an objective function in the linear programming, there is set "obtaining a difference between the residual chromatic dispersion value at the terminal node of each wavelength path and the residual chromatic dispersion target value set in step 12, that is, a compensation error in the residual chromatic dispersion in each wavelength path, to minimize the sum of the compensation errors in all of wavelength paths"; and also, as a constraint condition in the linear programming, there is set "the dispersion compensation amounts settable in the chromatic dispersion compensation module corresponding to each span being the DCM candidates set in step 13".

Such objective function and constraint condition can be described by relational expressions as shown in the following formulas (7) and (8).

Objective Function:

$$\text{Minimize} \sum_i (negRDerror[i] + posRDerror[i]) \qquad (7)$$

Constraint Condition:

$$\left. \begin{array}{l} |z[l]| \geq |DCM\_upper[l]| \\ |z[l]| \leq |DCM\_lower[l]| \\ \sum_{l \in i} (Dspan[l] - |z[l]|) - negRDerror[i] \leq RDtarget[i] \quad (\text{for } \forall\, i) \\ \sum_{l \in i} (Dspan[l] - |z[l]|) + posRDerror[i] \geq RDtarget[i] \quad (\text{for } \forall\, i) \end{array} \right\} \qquad (8)$$

In the above formulas, posRDerror[i] indicates a compensation error amount in the case where the error between the residual chromatic dispersion amount and the residual chromatic dispersion target value at the terminal node of each wavelength path WPi is positive, and negRDerror [i] indicates a compensation error amount in the case where the error between the residual chromatic dispersion amount and the residual chromatic dispersion target value at the terminal node of each wavelength path WPi is negative. Further, |z[I]| indicates an absolute value of the dispersion compensation amount of the DCM corresponding to the span SPI (generally, the dispersion compensation amount of the DCM has a negative value). |DCM_upper[I]| indicates an absolute value of an upper limit value of the range DCMrange of the chromatic dispersion compensation amounts in the span SPI, which is obtained when the DCM candidates are set in step 13, and |DCM_lower[I]| indicates an absolute value of a lower limit value of the range DCMrange. Namely, left-hand sides of the first and second relational expressions of the constraint condition represent the DCM candidates set in step 13. Further, Dspan[I] indicates the chromatic dispersion value in the span SPI, first terms in the left-hand sides of the third and fourth relational expressions of the constraint condition represent the residual chromatic dispersion at the terminal node of each wavelength path WPi, and negRDerror[i] and posRDerror[i] in second terms in the left-hand sides indicate the compensation error amounts as described above. Incidentally, RDtarget[i] in the right-hand sides of the third and fourth relational expressions is the residual chromatic dispersion target value at the terminal node of each wavelength path WPi set in step 12.

Further, it is also possible to express z[I] by the following relational expression to solve it by mixed integer programming (MIP) which is one of linear programming.

$$z[I]=x[I] \cdot DcmStep$$

In the above relational expression, DcmStep indicates a step size of the dispersion compensation amount of the chromatic dispersion compensation module (DCM), and x[I] is an integer value. As a result, the present invention can be applied to the chromatic dispersion compensation module (DCM) having the discrete dispersion compensation amount (the step size of the compensation amount is DcmStep[ps/nm]).

Thus, by setting the objective function and the constraint condition in the linear programming or the mixed integer programming, the optimum solution of the dispersion compensation amount of the DCM in each node can be readily computed utilizing typical mathematical programming software.

When the optimum solution of the dispersion compensation amount of each DCM is computed by the linear programming, the mixed integer programming or the like, in step 15 (FIG. 3), the computation result is output to the output apparatus 12 and the like. Then, the optimum value of the dispersion compensation amount of each DCM obtained by the present chromatic dispersion compensation designing system is transferred to each node via a network management system (NMS) or the like which centrally controls all of nodes on the optical network, so that the dispersion compensation amount of each DCM is set at the optimum value (refer to FIG. 2).

As described in the above, according to the present chromatic dispersion compensation designing system, even in the optical network having complex topology, such as the mesh network or the like, for all of wavelength paths set on the optical network, it is possible to readily realize the optimum designing of the chromatic dispersion compensation, which satisfies the desired optical signal quality at the terminal nodes, while suppressing the residual chromatic dispersion in each span during the transmission within a required range. Consequently, the degradation of the optical signal quality caused by the chromatic dispersion in all of wavelength paths on the optical network can be suppressed adequately, and as a result, the number of regeneration repeaters required in the optical network can be decreased to minimum so that the designing leading to a decrease of network cost can be realized.

Next, there will be described a preferred application example of the chromatic dispersion compensation designing method according to the present invention as described above, referring to a flowchart of FIG. 8.

Figure 8:
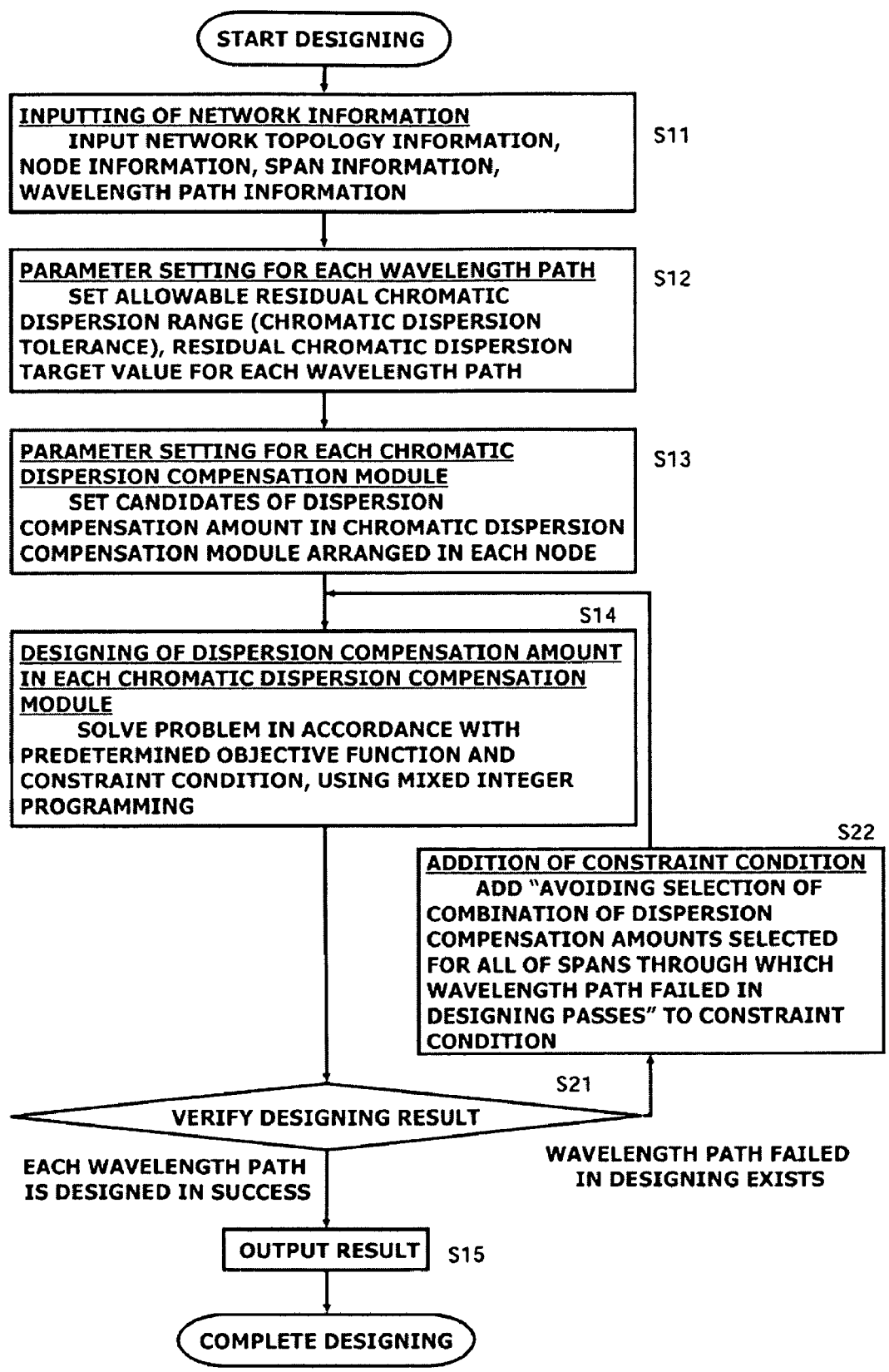
FIG. 8 is a flowchart showing an application example relating to the processing executed by the chromatic dispersion compensation designing system in FIG. 1.

In the chromatic dispersion compensation designing method shown in FIG. 8, after a series of processing in steps 11 to 14 is executed, step 21 for verifying the designing result in step 14 is added, and if it is found in step 21 that there exists the wavelength path for which the chromatic dispersion compensation designing is failed, step 22 for adding a constraint condition corresponding to such a failure is provided so that the computation processing by the mixed integer programming in step 14 is again executed. Incidentally, processing in steps 11 to 15 in FIG. 8 is same as that described above, and accordingly, the description thereof is omitted here.

In step 21, optical transmission characteristics in each wavelength path are estimated using the designing result of the dispersion compensation amount of each DCM computed in step 14, and it is judged whether the designing of the chromatic dispersion compensation has been made in success for all of wavelength paths, that is, whether predetermined optical transmission characteristics required by the optical network are obtained. If it is judged that the designing has been made in success for all of wavelength paths, the designing result is output in step 15, whereas if it is judged that there exists the wavelength path for which the designing is failed due to an influence of the chromatic dispersion, the routine proceeds to step 22.

In step 22, to the constraint condition in step 14, a constraint formula for "avoiding the selection of a combination of the chromatic dispersion compensation amounts selected in all of spans through which the wavelength path failed in designing passes" is added. Namely, in the processing in step 14 described above, since "minimizing the dispersion compensation error in all of wavelength paths" is the objective function, considering the case where the dispersion compensation amount of the DCM corresponding to each span has the discrete value (for example, the case where the dispersion compensation fiber module is used as the DCM or the like), there is a possibility that the residual chromatic dispersion value realized at the terminal node of such a wavelength path is not converged in the allowable residual chromatic dispersion range, depending on the combination of the dispersion compensation amount of each DCM for a certain wavelength path computed in step 14. Therefore, feedback processing (steps 21 and 22) containing the verification of the designing result is added, so that the designing result in which the residual chromatic dispersion value of each wavelength path is converged in the allowable residual chromatic dispersion range can be obtained, thereby capable of realizing the chromatic dispersion compensation designing with high precision.

To be specific, the constraint condition in the mixed integer programming computation processed in step 14 after the feedback processing can be described by relational expressions as shown in the following formulas (9) and (10) for example, and the constraint formula to be added for the wavelength path for which the designing has been judged to be failed in step 21 is the formula (10). Note, the formula (7) is applied to the objective function in the mixed integer programming after the feedback processing.

Constraint Condition:

$$TERM[i] - negRDerror[i] \le RDtarget[i] \quad \text{(for } \forall \, i\text{)}$$
$$TERM[i] + posRDerror[i] \ge RDtarget[i] \quad \text{(for } \forall \, i\text{)} \quad (9)$$
$$\sum_c INFOdcm[l, c] \cdot VARdcm[c] = 1 \quad \text{(for } \forall \, l\text{)}$$

Constraint Condition to be Added:

$$\sum_{c \in errordCombination} VARdcm[c] \le (NUMdcm[i] - 1) \quad (10)$$

Here, the explanation of each symbol used in the computation processing in step 14 inclusive of formulas (9) and (10) is collected up in Table 1.

TABLE 1

| Symbol | Explanation |
|---|---|
| l | Number of span SP (l = 1, 2, ...) |
| i | Number of wavelength path WP (i = 1, 2, ...) |
| c | Number of DCM candidate |
| Dspan[l] | Chromatic dispersion value of span SPl |
| Ddcm[c] | Chromatic dispersion value of DCM candidate c |
| INFOdcm[l, c] | Index of which value is 1 if DCM candidate c is DCM candidate for span SPl and is 0 if not |
| INFOroute[i, l] | Index of which value is 1 if wavelength path WPi passes through span SPl and is 0 if not |
| RDtarget[i] | Residual chromatic dispersion target value at terminal node of wavelength path WPi |
| VARdcm[c] | Index of which value is 1 if DCM candidate c is selected and is 0 if not |
| posRDerror[i] | Compensation error amount when error between residual chromatic dispersion value in wavelength path WPi and residual chromatic dispersion target value therein is positive |
| negRDerror[i] | Compensation error amount when error between residual chromatic dispersion value in wavelength path WPi and residual chromatic dispersion target value therein is negative |
| TERM[i] | Residual chromatic dispersion value at terminal node of wavelength path WPi |
| NUMdcm[i] | Number of DCMs corresponding to wavelength path WPi |

In the formula (9), TERM[i] indicating the residual chromatic dispersion value at the terminal end of the wavelength path WPi is specifically described by the following formula (11).

$$TERM[i] = \sum_l Dspan[l] \cdot INFOroute[i, l] + \sum_l \sum_c Ddcm[c] \cdot VARdcm[c] \cdot INFOdcm[l, c] \quad (11)$$

Further, the number NUMdcm[i] of DCMs corresponding to the wavelength path WPi used in the formula (10) is specifically described by the following formula (12).

$$NUMdcm[i] = \sum_l \sum_c VARdcm[c] \cdot INFOdcm[l, c] \cdot INFOroute[i, l] \quad (12)$$

Figure 9:
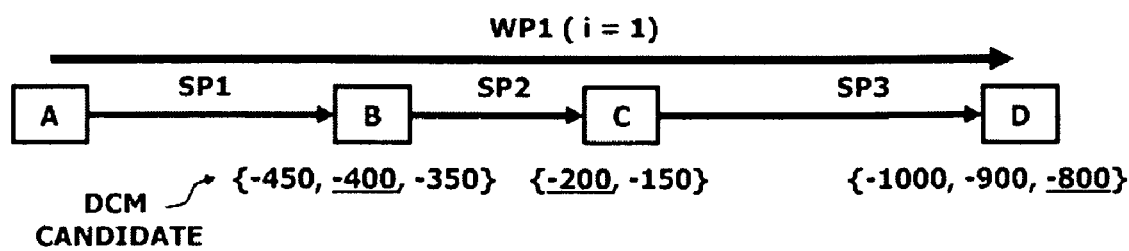
FIG. 9 is a diagram for explaining a feedback processing by steps 21 and 22 in FIG. 8.

Here, there will be described in detail the computation processing using the above formulas (9) to (12), using a specific example. Herein, as shown in an upper stage of FIG. 9 for example, on the supposition of the wavelength path WP1 (i=1) from the starting node A to the terminal node D, {−450, −400, −350} are set as the DCM candidates in the node B corresponding to the span SP1 between the nodes A and B, {−200, −150} are set as the DCM candidates in the node C corresponding to the span SP2 between the nodes B and C, and {−1000, −900, −800} are set as the DCM candidates in the node D corresponding to the span SP3 between the nodes C and D. Then, if, as the optimum solution of the dispersion compensation amount of the DCM for the wavelength path WP1, there is selected by the computation processing in step 14, for example the combination in which the dispersion compensation amount Ddcm of the DCM corresponding to the span SP1 is −400 ps/nm (l=1, c=2), the dispersion compensation amount Ddcm of the DCM corresponding to the span SP2 is −200 ps/nm (l=2, c=4) and the dispersion compensation amount Ddcm of the DCM corresponding to the span SP3 is −800 ps/nm (l=3, c=8), the index VARdcm[c] used in the above formulas (9) to (12) has values as shown in a lower stage of FIG. 9.

Then, by the verification of the designing result in step 21, if it is judged that the designing result for the wavelength path WP1 is failed, then, in step 22, a constraint condition shown in the following formula (10)' is added.

$$VARdcm[2] + VARdcm[4] + VARdcm[8] \le (NUMdcm[1] - 1) \quad (10)'$$

Here, the number NUMdcm[1] of DCMs corresponding to the wavelength path WP1 is 3.

As a result, in the computation processing executed by returning to step 14, that is, in the computation processing which applies the above formula (7) as the objective function in the mixed integer programming and also the above formulas (9) and (10) as the constraint condition, the combination including the chromatic dispersion compensation amount of the wavelength path WP1 for which the designing has been failed in the previous processing is no longer selected as the optimum solution. Consequently, since the feedback processing is repetitively executed until it is judged in step 21 that the designing for all of wavelength paths set on the optical network is made in success, it becomes possible to perform the chromatic dispersion compensation designing with high precision.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A chromatic dispersion compensation designing method of, in an optical network including a plurality of nodes connected to each other via optical transmission paths, setting a dispersion compensation amount in the chromatic dispersion compensation performed on a plurality of wavelength paths indicating routes from starting nodes to terminal nodes of a plurality of optical signals transmitted over the optical network, comprising processes of:

inputting with optical network information;

setting a residual chromatic dispersion target value at the terminal node for each wavelength path, based on the optical network information;

setting candidates of the dispersion compensation amount in a plurality of chromatic dispersion compensation modules arranged on the respective wavelength paths; and executing computation processing of selecting the dispersion compensation amount in each chromatic dispersion compensation module from the candidates so that the sum of errors between residual chromatic dispersion values and the residual chromatic dispersion target values at the terminal nodes for all of wavelength paths becomes minimum.

2. A chromatic dispersion compensation designing method according to claim 1, wherein
the process of setting the residual chromatic dispersion target value sets the residual chromatic dispersion target value to be inside an intermediate portion of an allowable residual chromatic dispersion range at the terminal end of each wavelength path.

3. A chromatic dispersion compensation designing method according to claim 2, wherein
the process of setting the residual chromatic dispersion target value sets the residual chromatic dispersion target value to be at a midpoint of the allowable residual chromatic dispersion range.

4. A chromatic dispersion compensation designing method according to claim 1, wherein
the process of setting the candidates of the dispersion compensation amount, when each chromatic dispersion compensation module is arranged on an input stage of an optical amplifier, sets the candidates of the dispersion compensation amount in each chromatic dispersion compensation module so that the power of optical signal passed through each chromatic dispersion compensation module is converged in an input dynamic range of the optical amplifier.

5. A chromatic dispersion compensation designing method according to claim 1, wherein
the process of setting the candidates of the dispersion compensation amounts sets a residual chromatic dispersion target value at each node in which the chromatic dispersion compensation module is arranged, for each wavelength path passing through the node, based on the residual chromatic dispersion target value at the terminal end of each wavelength path, and sets the dispersion compensation amounts corresponding to a range containing all of the set residual chromatic dispersion target values as the candidates for the chromatic dispersion compensation module.

6. A chromatic dispersion compensation designing method according to claim 5, wherein
the process of setting the candidates of the dispersion compensation amount, when the chromatic dispersion compensation module is arranged on an input stage of an optical amplifier, sets the candidates of the dispersion compensation amount in each chromatic dispersion compensation module so that the power of optical signal passed through each chromatic dispersion compensation module is converged in an input dynamic range of the optical amplifier.

7. A chromatic dispersion compensation designing method according to claim 1, wherein
the process of setting the candidates of the dispersion compensation amount sets a residual chromatic dispersion target value in each node in which the chromatic dispersion compensation module is arranged, according to a span distance corresponding to the node, and sets the dispersion compensation amounts corresponding to a range containing the set residual chromatic dispersion target value and an error allowable relative thereto, as the candidates for the chromatic dispersion compensation module.

8. A chromatic dispersion compensation designing method according to claim 7, wherein
the process of setting the candidates of the dispersion compensation amount, when the chromatic dispersion compensation module is arranged on an input stage of an optical amplifier, sets the candidates of the dispersion compensation amount in the chromatic dispersion compensation module so that the power of optical signal passed through each chromatic dispersion compensation module is converged in an input dynamic range of the optical amplifier.

9. A chromatic dispersion compensation designing method according to claim 1, wherein
the process of executing the computation processing computes optimum solution of the dispersion compensation amounts in the chromatic dispersion compensation modules by linear programming, provided that an objective function is to minimize the sum of errors between the residual chromatic dispersion values and the residual chromatic dispersion target values at the terminal nodes for all of wavelength paths and also a constraint condition is to select the dispersion compensation amounts in the chromatic dispersion compensation modules from the candidates.

10. A chromatic dispersion compensation designing method according to claim 1, further comprising the processes of:
estimating optical transmission characteristics of the respective optical wavelength paths by using the dispersion compensation amounts of the chromatic dispersion compensation modules selected by the computation processing, and judging whether or not all of wavelength paths satisfy predetermined optical transmission characteristics; and when there exists the wavelength path which does not satisfy the predetermined optical transmission characteristics, adding a condition in that a combination of dispersion compensation amounts which have been selected for the respective chromatic dispersion compensation modules through which such a wavelength path passes is not selected, and again executing the computation processing of selecting the dispersion compensation amounts in the chromatic dispersion compensation modules from the candidates so that the sum of errors between the residual chromatic dispersion values and the residual chromatic dispersion target values at the terminal nodes for all of wavelength paths becomes minimum.

11. A chromatic dispersion compensation designing system of, in an optical network including a plurality of nodes connected to each other via optical transmission paths, setting a dispersion compensation amount in the chromatic dispersion compensation performed on a plurality of wavelength paths indicating routes from starting nodes to terminal nodes of a plurality of optical signals transmitted over the optical network, comprising:
an inputting apparatus configured to input with optical network information;

a target value setting apparatus configured to set a residual chromatic dispersion target value in the terminal node for each wavelength path, based on the optical network information input by the inputting apparatus a candidates setting apparatus configured to set candidates of the dispersion compensation amount in a plurality of chromatic dispersion compensation modules arranged on the respective wavelength paths; and a computing apparatus configured to execute computation processing of selecting the dispersion compensation amount in each chromatic dispersion compensation module from the candidates set by the candidates setting apparatus so that the sum of errors between residual chromatic dispersion values and the residual chromatic dispersion target values at the terminal nodes for all of wavelength paths becomes minimum.

12. A chromatic dispersion compensation designing system according to claim 11, wherein the target value setting apparatus is configured to set the residual chromatic dispersion target value to be inside an intermediate portion of an allowable residual chromatic dispersion range at the terminal end of each wavelength path.

13. A chromatic dispersion compensation designing system according to claim 12, wherein the target value setting apparatus is configured to set the residual chromatic dispersion target value to be at a midpoint of the allowable residual chromatic dispersion range.

14. A chromatic dispersion compensation designing system according to claim 11, wherein the candidates setting apparatus is configured, when each chromatic dispersion compensation module is arranged on an input stage of an optical amplifier, to set the candidates of the dispersion compensation amount in each chromatic dispersion compensation module so that the power of optical signal passed through each chromatic dispersion compensation module is converged in an input dynamic range of the optical amplifier.

15. A chromatic dispersion compensation designing system according to claim 11, wherein the candidates setting apparatus is configured to set a residual chromatic dispersion target value in each node in which the chromatic dispersion compensation module is arranged, for each wavelength path passing through the node, based on the residual chromatic dispersion target value at the terminal end of each wavelength path set by the target value setting apparatus, and to set the dispersion compensation amounts corresponding to a range containing all of the set residual chromatic dispersion target values as the candidates for the chromatic dispersion compensation module.

16. A chromatic dispersion compensation designing system according to claim 15, wherein the candidates setting apparatus is configured, when the chromatic dispersion compensation module is arranged on an input stage of an optical amplifier, to set the candidates of the dispersion compensation amount in each chromatic dispersion compensation module so that the power of optical signal passed through each chromatic dispersion compensation module is converged in an input dynamic range of the optical amplifier.

17. A chromatic dispersion compensation designing system according to claim 11, wherein the candidates setting apparatus is configured to set a residual chromatic dispersion target value in each node in which the chromatic dispersion compensation module is arranged, according to a span distance corresponding to the node, and to set the dispersion compensation amounts corresponding to a range containing the set residual chromatic dispersion target value and an error allowable relative thereto, as the candidates for the chromatic dispersion compensation module.

18. A chromatic dispersion compensation designing system according to claim 17, wherein the candidates setting apparatus is configured, when the chromatic dispersion compensation module is arranged on an input stage of an optical amplifier, to set the candidates of the dispersion compensation amount in each chromatic dispersion compensation module so that the power of optical signal passed through each chromatic dispersion compensation module is converged in an input dynamic range of the optical amplifier.

19. A chromatic dispersion compensation designing system according to claim 11, wherein the computing apparatus is configured to compute optimum solution of the dispersion compensation amounts in the chromatic dispersion compensation modules by linear programming, provided that an objective function is to minimize the sum of errors between the residual chromatic dispersion values and the residual chromatic dispersion target values set by the target value setting apparatus at the terminal nodes for all of wavelength paths and also a constraint condition is to select the dispersion compensation amounts in the chromatic dispersion compensation modules from the candidates set by the candidates setting apparatus.

20. A chromatic dispersion compensation designing system according to claim 11, further comprising;

an estimating judgment apparatus configured to estimate optical transmission characteristics of the respective optical wavelength paths by using the dispersion compensation amounts in the chromatic dispersion compensation modules selected by the computing apparatus, and to judge whether or not all of wavelength paths satisfy predetermined optical transmission characteristics, wherein, when it is judged by the estimating judgment apparatus that there exists the wavelength path which does not satisfy the predetermined optical transmission characteristics, the computing apparatus is configured to add a condition in that a combination of dispersion compensation amounts which have been selected for the respective chromatic dispersion compensation modules through which such a wavelength path passes is not selected, and the computing apparatus executes again the computation processing of selecting the dispersion compensation amounts in the chromatic dispersion compensation modules from the candidates set by the candidates setting apparatus so that the sum of errors between the residual chromatic dispersion values and the residual chromatic dispersion target values set by the target value setting apparatus at the terminal nodes for all of wavelength paths becomes minimum.

* * * * *